March 17, 1959 W. R. SMITH 2,878,306
TELETYPEWRITER TESTING SYSTEM
Filed March 21, 1956
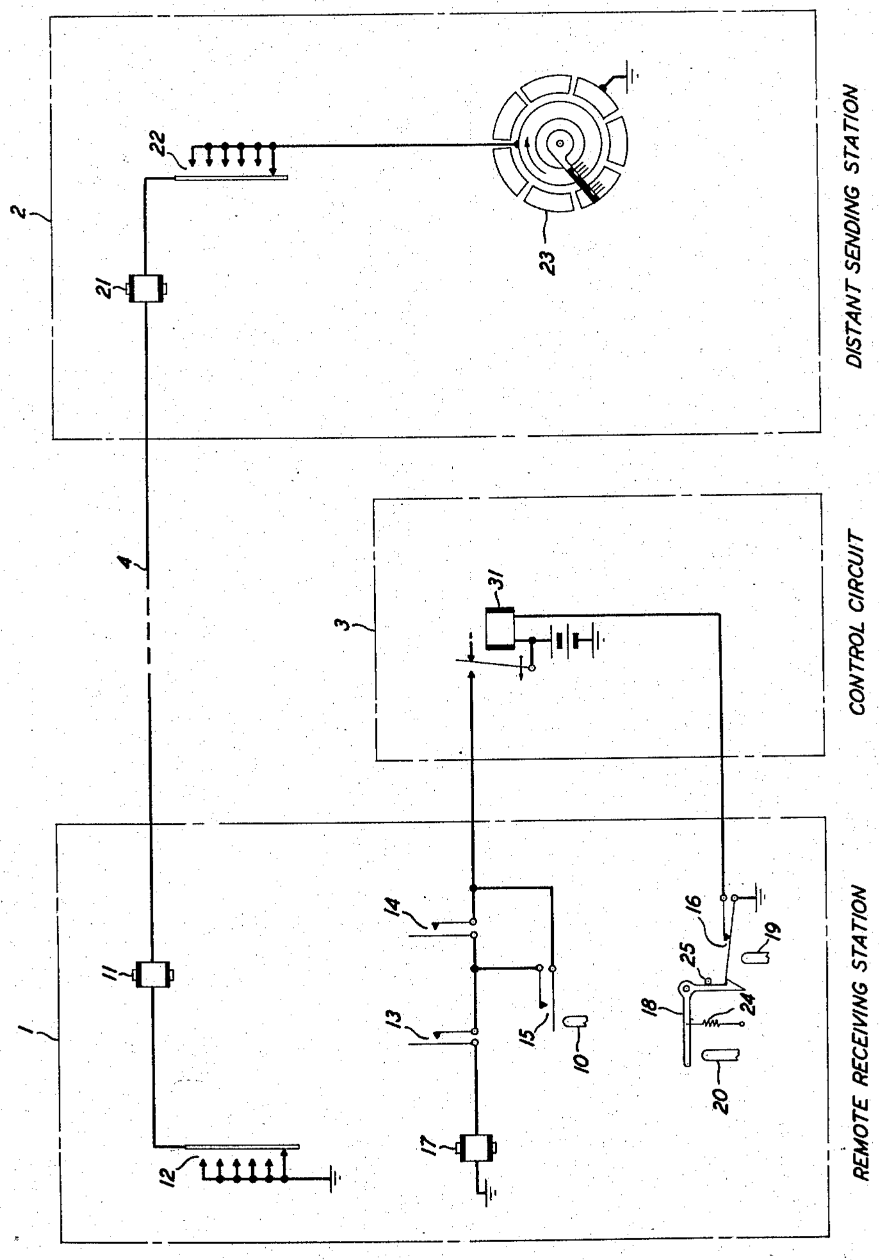
INVENTOR
W. R. SMITH
BY R. C. Terry
ATTORNEY 2,878,306

TELETYPEWRITER TESTING SYSTEM

William R. Smith, Cincinnati, Ohio, assignor to American Telephone and Telegraph Company, a corporation of New York Application March 21, 1956, Serial No. 572,980

6 Claims. (Cl. 178—4)

This invention relates to printing telegraph systems and more particularly to an arrangement for determining from one end of a transmission circuit the existence of certain conditions at a remote page-type printing teletypewriter associated in receiving relation.

The primary object of this invention is to provide, in a page-type printing teletypewriter system, a means for determining from a distant sending station, if conditions of power on, and proper stationery availability and alignment exist at a receiving page printer.

Another object is to provide in a remote page-type printing teletypewriter system, a means to be utilized conjointly with a sending station transmitter, to correct alignment of stationery at said remote page printer.

In printing telegraph systems using record material comprising a series of blank forms of uniform size, supplied in continuous strips, usually in the form of rolls or zig-zag folded packs, manual or automatic form feed-out mechanism has sometimes been utilized to feed the stationery form out of the printer and to feed in the next form until it is in proper recording position.

In such systems, it is desirable to have means available to determine from the sending station, prior to transmission of additional message material, if power is on at said printer and if the form feed mechanisms have functioned correctly to properly feed the stationery form into printing position at the receiving page printer.

It is also desirable in page printer systems to determine whether improper stationery alignment at the receiving mechanisms exists as a sole trouble condition and to correct this condition from the sending station prior to the transmission of additional message material.

A feature of this invention is the provision of a test arrangement, whereby an answer-back signal is generated by the receiving station in response to a call signal from the sending station, if conditions of power on and proper stationery availability and alignment exist at the page printing teletypewriter.

Another feature is the provision of an arrangement whereby an answer-back signal will be generated, in response to a second type of call signal, if improper stationery alignment, at the receiving mechanism, exists as a sole trouble condition.

Still another feature is the provision of an answer-back arrangement which may be used in conjunction with the sending of line feed signals by the distant transmitter to determine when misalignment of stationery at the remote printer has been corrected.

In accordance with a preferred embodiment of this invention, an arrangement is provided which is particularly adapted for use in connection with systems wherein the reception of data for business forms may be accomplished on an unattended basis. In this arrangement, an answer-back signal will be generated by the remote page printer in response to a call signal from the distant sending station, if conditions of power on, stationery available and proper stationery alignment exist at the printer. If no answer-back signal is received in response to the first call signal, it is an indication that a trouble condition exists at said printer, therefore a second distinct signal, herein referred to as an optional signal is transmitted by the sending station. If an answer-back signal is then received from the remote printer in response to the optional signal, it indicates that improper stationary alignment is the sole trouble condition. To correct this condition, the call signal is retransmitted and series of line feed signals, with a waiting period between each line feed signal, are then transmitted from the distance sending station. When the platen of the receiving printer reaches a position where correct alignment of stationery occurs, an answer-back signal will be generated before the next incoming line feed signal is received, thereby indicating to the sending station that line feeding may be discontinued and transmission of message material may begin. If in response to the sending of the optional signal no answer-back signal is received, the sending station will know that paper misalignment is not the sole trouble condition existing at the receiving printer.

For a complete understanding of the invention, reference may be had to the following detailed description to be interpreted in light of the acompanying drawing which shows a schematic circuit diagram of a teletypewriter system embodying this invention.

Referring now to the drawing, the reference numeral 1 designates a receiving station comprising a page printing teletypewriter as shown schematically by selector magnet 11, and keyboard transmitter 12. The page printing teletypewriter to which the present invention is applied may be of the type disclosed in Patent 1,904,164 issued April 18, 1933 to S. Morton et al. which is incorporated herein by reference.

In the receiving station 1, the page printing teletypewriter is equipped with a set of paper available contacts 13, platen index contacts 14, optional signal contacts 15, and test circuit control contacts 16. The platen index contacts may be associated with the platen in the manner disclosed by Patent 2,692,911, issued October 26, 1954 to W. Y. Lang, which is incorporated herein by reference, and are normally closed when the leading blank stationery form is so disposed in the printer that its leading edge is a predetermined distance past the printing point or position. The paper available contacts 13 are normally closed when blank paper is present in the printer. The normally open optional signal contacts 15, in parallel connection with the platen index contacts 14, close momentarily in response to an optional signal received by the page printer.

The test circuit control contacts 16, normally held closed by a latch lever 18, open upon the reception of a call signal, and close upon the reception of an answer-back signal. When selector magnet 11 responds to the answer-back signal, as will be described hereinafter, the answer-back function bar 19 raises the lower blade of contact 16 over the lip of latch lever 18, where it is held in the normally closed position as shown. When selector magnet 11 responds to the call signal, the call function bar 20 rocks the latch lever 18 clockwise, disengaging the lip from the lower blade of contact 16, allowing the blade to drop thereby opening contact 16. Spring 24 biases latch 18 in counterclockwise direction and stop pin 25 limits its movement in that direction.

The sending station, designated by reference numeral 2 comprises a keyboard transmitter teletypewriter, represented schematically by selector magnet 21 and transmitter contacts 22, and it may be of the type disclosed by Patent 1,904,164, issued April 18, 1933 to S. Morton et al. The sending station may also include a tape transmitter, represented schematically by distributor face 23, for automatic transmission of messages. The sending and receiving stations are interconnected by transmission line 4.

Numeral 3 designates a control circuit associated with the page printer at receiving station 1. It comprises a slow-to-release relay 31 which is energizable through the test circuit control contacts 16 and accordingly is normally energized. Relay 31 is releasable by the opening of contacts 16 to prepare a circuit for the energization of an answer-back magnet 17 associated with the page printer at the receiving station 1. An arrangement for initiating the generation of an answer-back signal is shown in Patent 2,152,010 granted March 28, 1939 to W. J. Zenner, the arrangement thus disclosed being incorporated herein by reference, as part of the present specification.

Normal operation of the page-type printing teletypewriter form positioning equipment at receiving station 1 will result in the conditions of power on, stationery available and stationery properly aligned relative to the angular position of the platen in which index contacts 14 are closed. If these conditions prevail, the stationery form upon which printing has been completed will have been fed out of the page-type printing teletypewriter and the next blank form fed in, therefore the stationery available contacts 13 will be closed unless the last form of a supply has been fed out. Platen index contacts 14 will also be assumed to be closed as the stationery form is properly aligned. For the purpose of checking that these conditions prevail, the call signal is generated by transmitter 22 at the sending station 2, and in response thereto the test circuit control contacts 16 of the page printer at receiving station 1 will open due to the tripping of latch 18, thereby releasing slow-release relay 31 of the control circuit 3, which will cause, after a time delay, the release of its armature thereby to prepare a circuit for the energization of the answer-back magnet 17 by connecting positive battery to one end of the series circuit consisting of contacts 13 and 14, and grounded answer-back magnet 17. Accordingly, if contacts 13 and 14 are closed, a circuit is completed from positive battery, back contact and armature of relay 31, contacts 13 and 14 and through answer-back magnet 17 to ground. Answer-back magnet 17 will be energized, thereby to cause transmitter 12 of the receiving station 1 to send an answer-back signal over the transmission channel, which signal will be received by receiving magnet 11 at receiving station 1 and receiving magnet 21 at transmitting station 2. The operator at sending station 2, upon seeing the answer-back signal character typed at the sending printer, will thereby be informed that station 1 is in proper condition to receive message material.

Also, receipt of the answer-back signal by receiving magnet 11 of receiving station 1 will cause the associated test circuit control contacts 16 to close, thereby energizing relay 31 which will disengage the armature from the back contact, removing positive battery from the circuit to the answer-back magnet 17. The foregoing is descriptive of the operational sequence in the event the conditions of power on, stationery available and stationery form properly aligned prevail at the receiving station page printer.

If, however, any one of the conditions of power on, stationery available and stationery form properly aligned does not exist, an answer-back signal will not be generated by the receiving printer. For instance, if the power is off, the answer-back magnet cannot cause transmission from transmitter 12. If no stationery form is in the page printer, contacts 13 will be open and the circuit to answer-back magnet 17 will be incomplete. Also, if the stationery form is misaligned, platen index contacts 14 will be open and again the circuit to answer-back magnet 17 will be incomplete and no answer-back signal will result.

Having determined, in the absence of an answer-back signal from the receiving station in response to the call signal, that a trouble condition exists at the page printer, the operator at the sending station will initiate a second sequence of testing by the transmission of an optional test signal from the sending station. The optional signal, being received by the receiving station, will result in momentary closure of the optional signal contacts 15 by function bar 10. Contacts 15 are in parallel with platen index contacts 14 thereby to place a shunt across the platen index contacts 14 in the series circuit to answer-back magnet 17. If no answer-back is generated in response to the call signal, but an answer-back is generated in response to the optional signal by the shunting of platen index contacts 14 upon closure of the optional signal contacts 15, it is indicated that the platen index contacts are open, that paper-available contacts 13 are closed, and that the teletypewriter is operative.

Now having determined that the misalignment of stationery at the printer is the source of trouble, the operator at the transmitting station 2 initiates procedure to correct this condition by retransmitting the call signal which will cause the sequence of events to occur as described previously. At receiving station 1, the test circuit control contacts 16, which were relatched in the closed condition in response to the answer-back signal, will open, thereby again releasing slow-release relay 13 of the control circuit 3, which will, after a time delay, again prepare a circuit for the energization of answer-back magnet 17 by connecting positive battery to one end of the series circuit including contacts 13 and 14 and grounded answer-back magnet 17. As it has been determined that only the platen index contacts 14 are open, due to stationery misalignment, the series circuit to answer-back magnet 17 is conditioned to energize the answer-back magnet 17, upon closure of platen index contacts 14.

The operator at sending station 2 will now transmit line feed signals by means of transmitter 22, to feed the stationery form line by line toward printing position, and the operator will delay a short interval after each line feed signal, awaiting possible reception of an answer-back signal before transmission of the succeeding line feed signal. When proper stationery positioning is achieved, the platen index contacts 14 will close, thereby completing the circuit to the answer-back magnet 15, and an answer-back signal will be received by the operator at transmitting station 2 as an indication that no further line feed signals need be transmitted and that transmission of message text may begin. Contacts 16 again become relatched and operate relay 31 in response to the answer-back signal. The testing arrangement is thus restored to its initial condition with relay 31 operated.

Although a specific embodiment of the invention has been shown in the drawings and described in the foregoing specification, it will be understood that the invention is not limited to this embodiment, but is capable of modification, substitution, and rearrangement of parts and elements, without departing from the spirit of the invention.

What is claimed is:

1. In a teletypewriter transmission system, a teletypewriter, a telegraph transmitter, a transmission channel interconnecting said teletypewriter and said transmitter, answer-back signal generating means including a magnet for initiating operation thereof, a plurality of contact means included in the operating path of said magnet and each when closed indicative of a different predetermined operative condition of said teletypewriter, means selectively responsive to a predetermined signal received from said transmitter for completing the circuit of said magnet through said contact means when closed, and other contact means selectively responsive to a different predetermined signal received by said teletypewriter for shunting one of said first-mentioned contact means to effect operation of said magnet as an indication that others of said first-mentioned contact means are closed.

2. In a teletypewriter transmission system, a page printing teletypewriter, a telegraph transmitter, a transmission channel interconnecting said teletypewriter and said transmitter, answer-back signal generating means including a magnet for initiating operation thereof, first contact means disposed in the energizing path of said magnet and closable by stationery supplied to said typewriter, second contact means also disposed in the energizing path for said magnet and closable by the platen of said page printing teletypewriter in a predetermined angular position of said platen, means selectively responsive to a predetermined signal received from said transmitter for completing the circuit of said magnet through both of said contact means when closed, and third contact means selectively responsive to a different predetermined signal received by said teletypewriter over said channel for shunting said second contact means to effect operation of said magnet as an indication that of said first and second contact means only the latter is open.

3. In a teletypewriter transmission system, a page printing teletypewriter adapted to be supplied with stationery comprising interconnected forms of uniform length bearing a predetermined relation to the circumference of the platen of said teletypewriter, answer-back signal generating means including a magnet for initiating operation thereof, first contact means disposed in the energizing path for said magnet and closable by a stationery form engaging said platen, second contact means closable by said platen upon presentation of the leading edge of a stationery form engaging said platen a predetermined distance beyond the printing position of said teletypewriter, means selectively responsive to a predetermined signal received from said transmitter for completing the circuit of said magnet through both of said contact means when closed, and third contact means selectively responsive to a different predetermined signal received by said teletypewriter over said channel for shunting said second contact means to effect operation of said magnet as an indication that of said first and second contact means only the latter is open.

4. In a teletypewriter transmission system, a teletypewriter, a telegraph transmitter, a transmission channel interconnecting said teletypewriter and said transmitter, answer-back signal generating means including a magnet for initiating operation thereof, at least two contact means included in the operating path of said magnet and each when closed indicative of a different predetermined operative condition of said teletypewriter, other contact means selectively responsive to a predetermined signal received over said channel from said transmitter for completing the circuit of said magnet through said first-mentioned contact means when closed, and means responsive to said answer-back signal for causing interruption of said circuit at said other contact means.

5. In a teletypewriter transmission system, a teletypewriter including a rotatable platen and a signal responsive feed mechanism for advancing said platen step by step, a telegraph transmitter, a transmission channel interconnecting said teletypewriter and said transmitter, answer-back signal generating means including a magnet for initiating operation thereof, contact means included in the operating path of said magnet and closable by said platen in a predetermined angular position thereof, other contact means selectively responsive to a predetermined signal received over said channel from said transmitter for completing the circuit of said magnet through said first-mentioned contact means when closed, and means responsive to said answer-back signal generated resultantly from completion of the circuit of said magnet immediately by said other contact means or subsequently by advancement of said platen to effect closure of said first-mentioned contact means for causing interruption of said circuit at said other contact means.

6. In a teletypewriter transmission system, a teletypewriter, a telegraph transmitter, a transmission channel interconnecting said teletypewriter and said transmitter, answer-back signal generating means including a magnet for initiating operation thereof, contact means disposed in the energizing path for said magnet and closable, when open, in response to a variable number of transmissions of a predetermined signal by said transmitter, means for completing the circuit of said magnet through said contact means including a relay for normally withholding operating potential from said path and normally latched contacts for controlling said relay, means responsive to a predetermined signal received from said transmitter for unlatching said normally latched contacts to cause said relay to connect operating potential to said path, and means responsive to said answer-back signal for relatching said contacts to cause disconnection of said operating potential from said path by said relay.

References Cited in the file of this patent

UNITED STATES PATENTS

| | | |
|---|---|---|
| 2,289,746 | Bacon | July 14, 1942 |
| 2,474,257 | Kleinschmidt | June 28, 1949 |
| 2,690,548 | Joel | Sept. 28, 1954 |